United States Patent [19]
Becht

[11] 3,761,994
[45] Oct. 2, 1973

[54] MAGNETIC TAPE HEAD CLEANING APPARATUS

[76] Inventor: Andrew B. Becht, 2013 N. Rose St., Burbank, Calif. 91505

[22] Filed: Feb. 1, 1972

[21] Appl. No.: 222,535

[52] U.S. Cl. ..... 15/210 R, 15/104.94, 179/100.2 Z, 274/47
[51] Int. Cl. .......... G11b 5/40
[58] Field of Search .......... 15/210 R, 104.94; 274/47; 179/100.2 Z

[56] References Cited
UNITED STATES PATENTS

| | | | |
|---|---|---|---|
| 3,655,924 | 4/1972 | Puskas | 179/100.2 Z X |
| 3,439,922 | 4/1969 | Howard | 15/210 R |
| 3,636,276 | 1/1972 | Rose | 274/47 X |

*Primary Examiner*—Leon G. Machlin
*Attorney*—Spensley, Horn and Lubitz

[57] ABSTRACT

The present invention is a device used to clean the magnetic tape head of a magnetic tape recording/-playback unit incorporating the use of cartridge mounted magnetic tape. A housing of substantially the same shape and size of a magnetic tape cartridge is adapted to be inserted within the cartridge receiving aperture of the magnetic tape playback/recording unit. A spring biased arm is disposed within the housing. A cleaning portion for contacting the magnetic tape head extends from one end of the housing; a portion for adjusting the position of the arm extends from the end of the housing which is accessible from the exterior of the magnetic tape playback/recording unit. Three dimensional, spring biased movement of the cleaning portion of the mounted arm provides for full contact with the magnetic tape head and permits cleaning thereof.

8 Claims, 6 Drawing Figures

PATENTED OCT 2 1973 3,761,994

MAGNETIC TAPE HEAD CLEANING APPARATUS

BACKGROUND OF THE INVENTION

1. Field of the Invention

The present invention magnetic tape head cleaning apparatus is generally within the field of cleaning equipment, but more particularly that cleaning equipment adapted to be used for cleaning magnetic tape heads.

2. Prior Art

The increased use of magnetic tape as a source for entertainment and other purposes has produced the need for more efficient ways to maintain the equipment. The cartridge tape playback/recording units being used within automobiles and for other uses have several characteristics in common. The units which utilize either four-track or eight-track tapes use a standardized cartridge. In addition, the cartridge is inserted within an aperture in the playback/recording unit which prevents direct access to the magnetic tape head or the capstan used for providing the motive force to the tape.

It has long been recognized that continued use of the playback/recording unit will result in accumulation of dirt or other debris at the magnetic tape head. The accumulation of dirt or other debris will result in degraded reproduction from or recording of the magnetic tape because of interference at the head gap potentially resulting in total failure of the playback/recording unit.

The difficulty in gaining access to the magnetic tape head has lead to the development of devices which are disclosed by the prior art, none of which satisfactorily solve all of the inherent problems. One of the devices disclosed by the prior art uses a tape cartridge having an abrasive material mounted in place of the tape. The cleaning action of the magnetic tape heads is mechanical in nature and is intended to abrasively rub all dirt or debris from the face of the magnetic tape head. The problem with this type of device is apparent. The magnetic tape head is a sensitive component made of small subcomponents, the action of contacting the surface of the magnetic tape head with an abrasive tape will eventually result in damage and possible destruction of the magnetic tape head.

Another device disclosed by the prior art incorporates a mounted endless felt strip within a magnetic tape cartridge. The felt strip is urged through the cartridge in the same manner as magnetic tape. The device is intended to clean the magnetic tape head by impregnating the felt strip with isopropyl alcohol or other like cleaning fluid and allows the movement of the felt strip across the magnetic tape head to clean dirt and other debris from the magnetic tape head. Several problems remain unsolved through the use of this device. Since the felt is mounted within the tape cartridge to move therethrough in a manner analogous to tape, there is a substantial volume of felt material. This will result in substantially diffusing the cleaning fluid throughout the felt. This results in very week concentration of the cleaning fluid at the point of contact with the magnetic head thereby minimizing the cleaning effect of the device. Another problem results in the inability to apply sufficient pressure on the tape head to carry out the cleaning function. Since the felt strip is mounted in a manner analogous to magnetic tape, pressure cannot be asserted against the strip to force it against the magnetic head since this would in effect stop the rotation of the capstan or otherwise halt the movement of the strip through the cartridge. Since this type of device requires movement of the fluid impregnated strip, halting the movement of the tape obviously precludes any cleaning action upon the magnetic head.

The present invention substantially solves those problems left unresolved by the devices disclosed in the prior art. A spring biased cleaning arm is disposed within a cartridge adapted to be mounted within the playback/recording unit for contacting the magnetic heads. The cleaning arm is provided with a cleaning surface which is able to contact substantially all portions of the magnetic tape head irrespective of its shape, the mounting of the cleaning arm providing for three dimensional, spring biased movement.

SUMMARY OF THE INVENTION

The present invention comprises an apparatus for providing means to clean the magnetic tape head assembly of a playback/recording unit adapted for mounting tape cartridges. The need for cleaning the magnetic tape head arises out of the structure of the magnetic tape head itself. The magnetic tape head assembly involved typically comprises separtate heads for the particular number of recorded tracks of the tape being used. Each magnetic head is typically constructed of two identical core halves built of thin laminations of magnetic alloy material. Each half is then wound precisely with an identical number of turns and assembled with non-magnetic separators at the front and rear with a miniscule gap remaining at the bottom of the head which contacts the magnetic tape. As the tape transport draws the tape across the head, the gap between the core halves is shunted, and the magnetic flux path is completed. The head gap is critical in both the recording and reproduction phase of the process. When recorded tape is drawn across the gap of the head, the portion of the tape in actual contact with the gap bridges the magnetic core of the head causing magnetic flux to flow through the core. The head gap size depends on the intended function of the head. For a record head, it must be wide enough to permit the flux to penetrate the tape deeply, yet narrow enough to obtain sharp gradients of flux. For a reproduction head, gap size must be a compromise between the upper-frequency limit, dynamic range and head life. Extremely close mechanical tolerances are inherent in the head gap as well as the flux position of the tape and magnetic head. If dirt or other debris lodges on the surface of the magnetic tape head or within the head gap, the strength of the magnetic flux will be deleteriously affected. Therefore, in order to maintain proper operating conditions, the magnetic tape head must be cleaned to remove any dirt or debris which accumulates as a result of the environmental conditions in which the transport is being used or becuase of dirt and debris physically disposed on the magnetic tape.

Tape transports utilizing cartridge mounted magnetic tape present a difficult problem with regard to cleaning the magnetic tape head assemblies. The magnetic head is internal to the apparatus, it being intended that the cartridge be injected within an aperture in the transport to commence operation. Since the magnetic tape head is virtually inaccessable, the need for the present invention has arisen. A housing having substantially the same shape as a magnetic tape cartridge provides for mounting the cleaning apparatus. The cleaning arm is centrally disposed within the housing, the arm being spring biased and providing for pivotal movement about a central fulcrum within the housing. The cleaning portion of the arm is therefore provided with three dimensional spring biased movement to allow contact with all portions of the magnetic tape head within the transport. In addition, the housing is provided with a cleaning surface for contacting the transport capstan to remove any dirt or debris which has accumulated on the capstan itself.

It is therefor an object of the present invention to provide an improved magnetic tape head cleaning apparatus.

It is another object of the present invention to provide a non-abrasive magnetic tape head cleaning apparatus.

It is still another object of the present invention to provide an improved magnetic tape head cleaning apparatus mounted within a tape cartridge.

It is still yet another object of the present invention to provide a magnetic tape head cleaning apparatus incorporating means for cleaning the capstan of the magnetic tape transport.

The novel features which are believed to be characteristic of the invention, both as to its organization and method of operation, together with further objectives and advantages thereof will better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

DESCRIPTION OF THE PRESENTLY PREFERRED EMBODIMENT

Figures 1, 2, 4, 5:
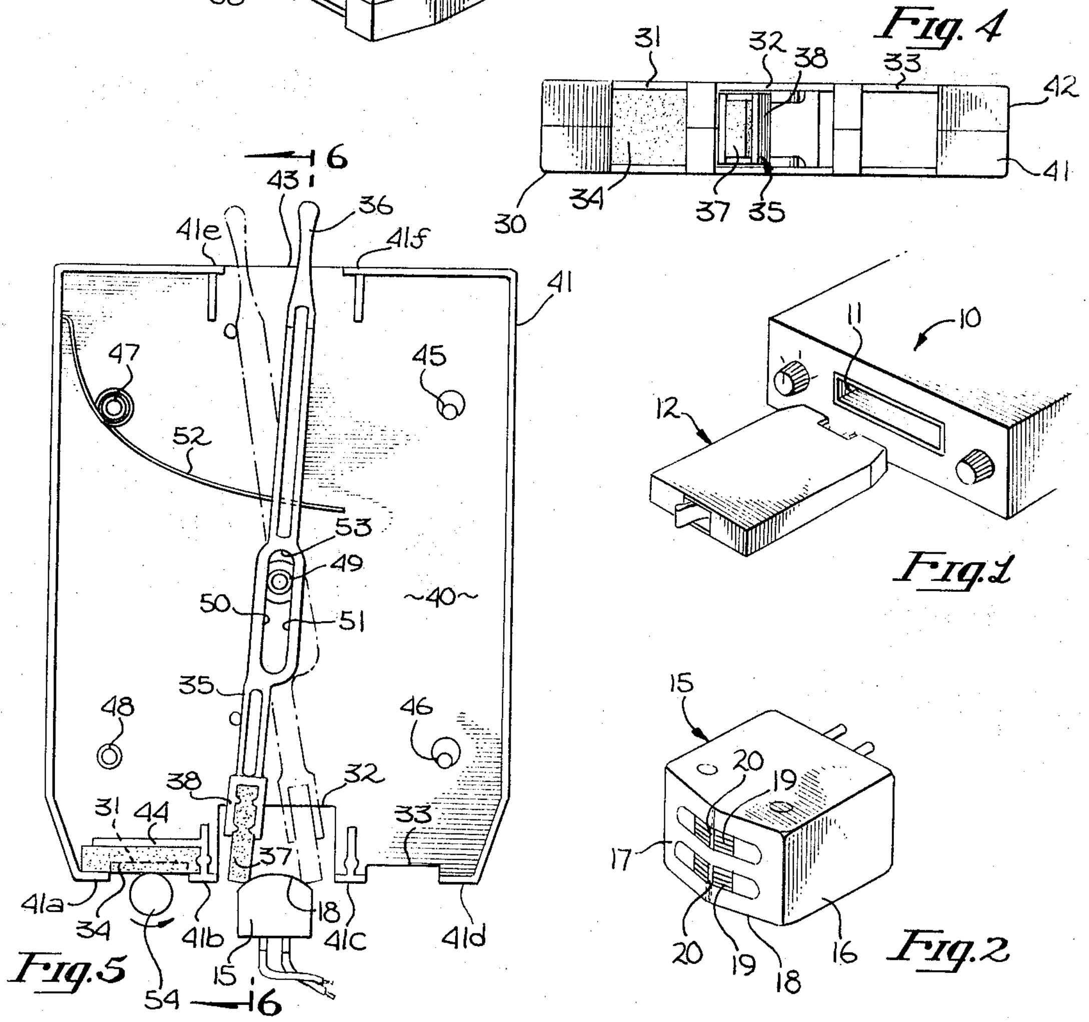
FIG. 1 is a front perspective view of a magnetic tape transport adapted for cartridge mounted magnetic tape illustrating the placement of the present invention.
FIG. 2 is a front perspective view of an exemplary magnetic tape head to be cleaned in accordance with the present invention.
FIG. 4 is a front elevation view of the present invention.
FIG. 5 is a cross-sectional view taken through line 5—5 of FIG. 4 illustrating the movement of the magnetic tape head cleaning arm in accordance with the present invention.

An understanding of the use of the present invention magnetic tape head cleaning apparatus can be best gained by reference to FIG. 1 where an exemplary magnetic tape transport unit is shown, the transport unit being generally designated by the reference numeral 10. Magnetic tape transport unit 10 is typically a reproduction unit adapted to receive magnetic tape cartridges. As shown in FIG. 1, transport unit 10 has an aperture 11 for receiving the cartridge unit within which the magnetic tape is disposed. In conventional transport units, the magnetic head assembly used as the means for transducing the magnetically recorded information to audio signals is located within the outer housing of transport unit 10. As shown in FIG. 1, an embodiment of the present invention magnetic tape head cleaning apparatus is shown being inserted within aperture 11, the present invention apparatus being generally designated by the reference numeral 12.

Magnetic tape head cleaning apparatus 12 is disposed within aperture 11 of transport unit 10 in substantially the same manner as the magnetic tape cartridge which is intended for use within transport unit 10. The structure of magnetic tape head cleaning apparatus 12 will be described in detail below. Although the present invention magnetic tape transport apparatus 12 is typically used with an eight-track reproducing transport unit, it is obvious that transport unit 10 could be a conventional recording/playback unit.

A understanding of the need for the present invention magnetic tape head cleaning apparatus 12 can be best gained by reference to FIG. 2 wherein an exemplary magnetic tape head assembly is shown, the assembly being generally designated by the reference numeral 15. Magnetic head assembly 15 comprises an outer housing 16 having a convex profile 18 adequate for interface with the magnetic tape disposed within a suitable cartridge. In the case of head assembly 15 as shown in FIG. 2, head assembly 15 comprises an 8-track magnetic head. Magnetic head assembly 15 consists of eight magnetic heads 19, each made up of a pair of core halves typically built of thin laminations of alloy materials. Each core half is precisely wound with a predetermined number of turns and assemblied with non-magnetic separators at the front and rear of the head with a small gap 20 separating the core halves. The spacing between magnetic head 19 becomes important to eliminate crosstalk between tracks.

In operation, when magnetic tape is drawn across gap 20, the portion of tape in actual contact with the gap bridges the gap between the magnetic core halves causing magnetic flux to flow through the core. As transport 10 draws the tape across surface 17 of head assembly 15, gap 20 is shunted and the flux path through each of magnetic heads 19 is completed. If dirt or other debris should lodge in gap 20 or cause a shunted medium to exist between adjacent tracks, the performance of magnetic head assembly 15 and therefore transport 10 would be seriously degraded. It therefore becomes obvious that means must be provided to effectively remove any dirt or debris which may become lodged between any pair of core halves of a magnetic head 19 or between adjacent tracks.

Figure 3:
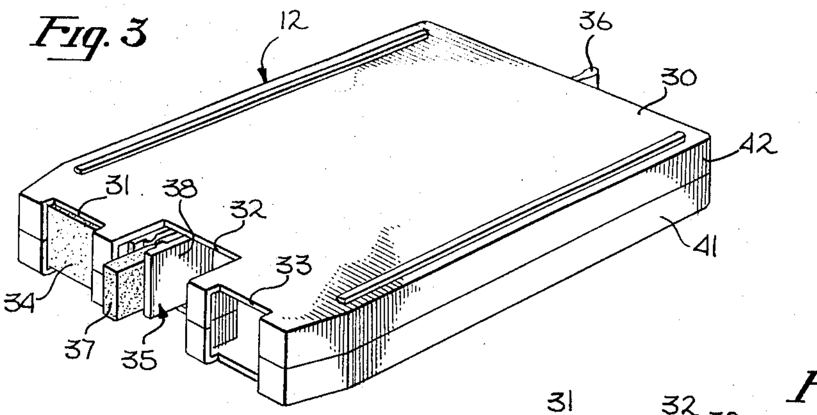
FIG. 3 is a front perspective view of the present invention magnetic tape head cleaner illustrating the quiescent position of the cleaning portion of the present invention.

An understanding of the preferred embodiment of the present invention magnetic tape head cleaning apparatus can be best gained by reference to FIG. 3 and FIG. 4. The present invention magnetic tape head cleaning apparatus comprises an outer housing 30 which is structurely similar to the magnetic tape cartridges used with transport 10 (FIG. 1). The front surface of housing 30 has three apertures 31, 32 and 33 to interface with the structural assembly of transport 10. Aperture 31 will receive the capstan of transport 10, this to be explained in detail below. Aperture 32 at the center of housing 30 will be in cooperative relationship with the magnetic head assembly 15 of transport 10. As will be discussed below, cleaning pad 34 is disposed within aperture 31 and will contact the capstan of transport unit 10 when the present invention magnetic tape head cleaning apparatus 12 is mounted within tape transport unit 10. Cleaning arm 35 is mounted within housing 30, cleaning arm 35 having handle 36 to provide means to move cleaning arm 35 at one end of arm 35. Handle 36 will be exterior to the mounted housing 30 upon loading the present invention apparatus 12 within tape transport unit 10. The portion of cleaning arm 35 disposed within aperture 32 comprises the means for contacting the front surface 17 of head assembly 15 (FIG. 2). Cleaning pad 37 is mounted within clamp 38 of cleaning arm 35 and is disposed in a manner which will insure contact between cleaning pad 37 and front surface 17 of head assembly 15 (FIG. 2) when the present invention cleaning apparatus 12 is inserted into tape transport unit 10. As can be seen from FIG. 4, cleaning pad 37 has a height which is substantially equal to the height of housing 30. This will insure that the all portions of the magnetic heads 19 of head assembly 15 are contacted by cleaning pad 37.

The construction of the present invention magnetic tape head cleaning apparatus 12 can be best gained by reference to FIG. 5 wherein a top plan view of the internal structure of the present invention apparatus is shown. FIG. 5 illustrates that housing 30 comprises a major casing or bottom portion 40 having a peripheral sidewall 41 extending normal thereto of uniform height about its periphery, its top edge being parallel to bottom wall 40. Peripheral sidewall 41 is provided with three spaced apertures 31, 32 and 33 dividing the front section of peripheral sidewall 41 into narrow sections 41a and 41b bounding aperture 31, sections 41b and 41c bounding aperture 32 and sections 41*c* and 41*d* bounding aperture 33. Cover 42 as shown in FIG. 3 has complementary portions along the peripheral wall thereof to complete apertures 31, 32 and 33. The rear portion of peripheral sidewall 41 has sections 41*e* and 41*f* which bound aperture 43, aperture 43 in axial alignment with bottom wall 40 and aligned with aperture 32. Interior wall 44 extends normal to bottom wall 40, interior wall 44 being parallel to peripheral sidewall sections 41*a* and 41*b*. Interior wall 44 is in spaced relation with sidewall sections 41*a* and 41*b* as well as the boundary for aperture 31, the spacing between interior wall 44 and sidewall sections 41*a* and 41*b* being adapted to securely support cleaning pad 34 therebetween. Housing 30 is typically constructed of rigid plastic and can be formed by conventional injection molding processes.

In order to mount cover 42 upon peripheral sidewall 41, guide pins 45 and 46 and mating receptacles 47 and 48 are disposed in bottom wall 40. It is obvious the interior surface of cover 42 has receptacle pins and receptacles complementary to that shown in FIG. 5.

Figure 6:
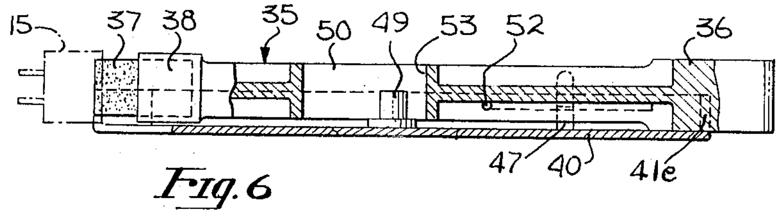
FIG. 6 is a side elevation view of the cleaning arm of the present invention in partial cross-section showing contact of the cleaning arm and the face of the magnetic tape head.

The structure of cleaning arm 35 can be best seen by reference to FIG. 5 and FIG. 6. Cleaning arm 35 is typically molded plastic and is mounted upon cylindrical pivot 49 extending normal to bottom wall 40 and being in axial alignment with apertures 43 and 32. To provide for longitudinal movement of cleaning arm 35 along the axis between apertures 32 and 43, cleaning arm 35 has a central channel portion comprising parallel, spaced sidewalls 50 and 51 having a suitable longitudinal travel, the spacing between walls 50 and 51 providing for cooperative, sliding engagement witn pivot 49. Cleaning arm 35 is extended to handle 36 which protrudes through aperture 43 and provides for manual contact with cleaning arm 35.

Cleaning arm 35 is extended to clamp 38 which extends substantially normal to bottom wall 40 and is substantially the same height as the distance between bottom wall 40 and the wall comprising cover 42. Cleaning pad 37 is securely lodged in frictional engagement within clamp 38 in a manner which will be preclude inadvertent dislodgment of cleaning pad 37.

The preferred embodiment of the present invention utilizes spring 52 to spring bias cleaning arm 35 to provide for contact between portion 53 of cleaning arm 35 and pivot 49 while the cleaning arm is in its quiescent position and resiliently urge cleaning arm 35 forwardly to counteract the opposing force which will be created when cleaning pad 37 contacts front surface 17 of magnetic tape head assembly 15. The contact between cleaning pad 37 and magnetic head assembly 15 can be best seen by reference to FIG. 5 and FIG. 6. As housing 30 is moved through aperture 11 of tape transport 10, cleaning pad 37 will contact front surface 17 of magnetic head assembly 15. Since cleaning arm 35 is spring biased, force will be exerted upon front surface 17 of head assembly 15 when housing 30 is fully inserted. This can be seen by the altered position of portion 53 from the stated quiescent condition whereat pivot 49 is in abutment with portion 53 of cleaning arm 35. The three dimensional, spring biased action of cleaning arm 35 is illustrated in FIG. 5. Pivot 49 provides a fulcrum about which cleaning arm 35 is pivoted in a manner to provide full contact between cleaning pad 37 and front surface 17 of head assembly 15. Longitudinal pressure can be applied against front surface 17 of magnetic head 19 by providing manual, longitudinal force at handle 36 of cleaning arm 35. The ability to pivot cleaning arm 35 about pivot 49 provides full control of the applied force to the needed angular position.

With the present invention magnetic tape head cleaning apparatus 12 inserted, both the magnetic heads 19 and capstan 54 of transport 10 can be cleaned. As was stated, one of the problems inherent in the prior art was the inability to maintain proper pressure upon the magnetic head since pressure upon the tape used in the prior art would preclude movement by the capstan. In the present invention, the two functions are independent of one another. When the present invention magnetic tape head cleaning apparatus 12 is inserted, cleaning pad 34 will be urged against the rotating capstan 54. In addition, as described hereinabove, cleaning pad 37 will be properly aligned to clean front surface 17 of magnetic head assembly 15. In order to provide for appropriate cleaning of the subject surfaces, isopropyl alcohol or other appropriate cleaning fluids are disposed upon cleaning pads 34 and 37. Cleaning pads 34 and 37 are preferably fabricated of soft, absorbent material such as felt. Since the size of cleaning pad 34 and cleaning pad 37 is limited to the general size of the surfaces to be cleaned, diffusion of the cleaning fluid to preclude proper cleaning is substantially eliminated. In addition, since neither cleaning operation comprises an abrasive action, neither the capstan nor the magnetic heads are damaged by the cleaning function.

The present invention magnetic tape head cleaning apparatus provides a device for easily cleaning the magnetic tape heads and capstan of a conventional magnetic tape transport unit. The use of the present invention substantially simplifies the ability to maintain the operability of the magnetic tape heads as well as eliminating the damage caused by the devices disclosed in the prior art.

I claim:

1. A magnetic tape head cleaning apparatus comprising:

a. a housing having a bottom wall and peripheral front, rear and side walls and having at least one aperture in the front peripheral wall and an aligned aperture in the rear peripheral wall;

b. a three dimensional, spring-biased cleaning arm, said cleaning arm having a handle portion disposed through the aperture in said rear peripheral wall and cleaning means for cleaning the magnetic tape head disposed through the aperture in said front peripheral wall; and c. means for coupling said arm to the bottom wall within said housing in a manner to permit bodily translation and rotation of said arm relative to said bottom wall.

2. A magnetic tape head cleaning apparatus for use with a magnetic tape transport having a magnetic head assembly and rotating capstan comprising:

a. a cartridge housing having a bottom wall and front, rear and side peripheral walls normal to said bottom wall, said front wall having first and second apertures disposed in said front peripheral wall and a third aperture disposed in said rear peripheral wall, said second and third apertures being in axial alignment with each other and with said bottom wall;

b. a pivot extended upwardly from said bottom wall in alignment with said second and third apertures;

c. a spring-biased member having a center portion slidably coupled about said pivot in a manner to permit bodily translation and rotation of said member relative to said pivot, a handle portion extending through said third aperture and a clamp extending through said second aperture; and d. cleaning means for cleaning the magnetic tape assembly coupled to the clamp of said spring-biased member.

3. A magnetic tape head cleaning apparatus as defined in claim 2 wherein said apparatus includes:

a. an upwardly depending wall member normal to said bottom wall and in parallel, spaced relation with said front peripheral wall, said member being substantially adjacent to said first aperture; and b. an absorbent pad mounted between said upwardly depending wall member and from said peripheral wall and extending laterally beyond said first aperture whereby the capstan of the magnetic tape transport is contacted by a cleaning surface.

4. A magnetic tape head cleaning apparatus as defined in claim 2 wherein said cleaning means is removably coupled to said clamp and comprises an absorbent pad of substantially the same height as said clamp and uniformly extending beyond said peripheral wall whereby the magnetic tape head assembly of the magnetic tape transport is contacted.

5. A magnetic tape head cleaning apparatus as defined in claim 2 wherein said spring-biased member is resiliently moved upon contact with the magnetic tape assembly and is pivotable about said pivot through a predetermined angular distance.

6. A magnetic tape head cleaning apparatus for use with a magnetic tape transport having a magnetic head assembly and capstan comprising:

a. a cartridge housing having a bottom wall and front, rear and side peripheral walls normal to said bottom wall, said front wall having first and second apertures disposed in said front wall and a third aperture disposed in said rear peripheral wall, said second and third apertures being in axial alignment with each other and said bottom wall;

b. a pivot extending upwardly from said bottom wall in alignment with said second and third apertures;

c. a cleaning arm comprising:

i. a central channel having side walls in parallel, spaced relation slidably mounted about said pivot;

ii. a cleaning member extending from said channel to said second aperture;

iii. a clamp depending from said cleaning member and extending to said front peripheral wall;

iv. a handle member depending from said channel and in alignment with said cleaning member, said handle member extending through said third aperture and beyond said rear peripheral wall;

d. resilient means coupled to said handle member substantially adjacent said channel for resiliently urging said cleaning arm toward said front peripheral wall; and e. an absorbent pad coupled to said clamp, said absorbent pad being substantially the same height as said clamp and uniformly extending beyond said front peripheral wall whereby the magnetic head assembly of the magnetic tape transport is contacted.

7. The magnetic head cleaning apparatus as defined in claim 6 wherein said cleaning arm is pivotable about said pivot through a predetermined angular distance.

8. A magnetic tape head cleaning apparatus as defined in claim 6 including:

a. a wall member depending upwardly from and normal to said bottom wall and being in parallel spaced relation with said front peripheral wall, said upwardly depending wall member being substantially adjacent to said first aperture; and b. an absorbent pad mounted between said upwardly depending wall member and said front peripheral wall and extending laterally beyond said first aperture whereby the capstan of the magnetic tape transport is contacted by a cleaning surface.

* * * * *